United States Patent [19]
Podaras et al.

[11] 4,184,420
[45] Jan. 22, 1980

[54] BARBECUE OVEN

[75] Inventors: William N. Podaras; Joseph M. Berta, both of Gastonia, N.C.

[73] Assignee: The Tabernacle of God, Inc., Gastonia, N.C.

[21] Appl. No.: 938,032

[22] Filed: Aug. 30, 1978

[51] Int. Cl.² ............................................. A47J 27/00
[52] U.S. Cl. .......................................... 99/427; 99/446
[58] Field of Search ................ 99/427, 446, 447, 448, 99/480

[56] References Cited

U.S. PATENT DOCUMENTS

| | | | |
|---|---|---|---|
| 2,763,200 | 9/1956 | Kittler | 99/446 |
| 2,790,380 | 4/1957 | Shryack | 99/427 X |
| 2,926,655 | 3/1960 | Martin | 99/447 X |
| 3,333,529 | 8/1967 | Wilson | 99/427 X |
| 3,498,211 | 3/1970 | Atkins | 99/446 X |
| 3,524,403 | 8/1970 | Treloar et al. | 99/446 X |
| 3,792,654 | 2/1974 | Turner | 99/427 |
| 3,967,547 | 7/1976 | Sykes et al. | 99/446 X |

*Primary Examiner*—Stanley N. Gilreath
*Attorney, Agent, or Firm*—Clifton T. Hunt, Jr.

[57] ABSTRACT

A barbecue oven including a housing containing a rotatable meat holder, a fire shield beneath the rotatable meat holder, at least one fluid containing compartment above the fire shield, a foraminated tray beneath the fire shield for supporting a desired wood to produce smoke for flavoring the meat, means beneath the foraminated tray for supporting combustion, and flues above the rotatable meat support providing communication between the interior of the housing and the atmosphere. The above described parts are arranged in relatively close relation to each other to provide the optimum smoke, heat and moisture for cooking the meat, whereby a large quantity of meat may be cooked with optimum flavor in a minimum length of time.

24 Claims, 7 Drawing Figures

BARBECUE OVEN

DESCRIPTION

BACKGROUND OF THE INVENTION

Barbecue ovens have long been known and they universally provide means for subjecting meat to heat and smoke.

Difficulty has been experienced in the prior art in supporting the meat in such a manner as to receive maximum benefit from the smoke without being subjected to the danger of burning from the fire producing the smoke. U.S. Pat. Nos. 2,722,883 issued Nov. 8, 1955 to C. A. Rignell and 3,498,211 issued Mar. 3, 1970 to T. H. Atkins illustrate prior attempts to prevent the meat from burning while imparting maximum smoke and flavoring to the meat. See also U.S. Pat. Nos. 2,881,695 to Di Pietro, 3,524,403 to Treloar, 3,901,136 to Wilson, 4,064,796 to Jones and 3,967,547 to Sykes et al. The prior art as exemplified by Atkins and Sykes solves the problem by directing the greases from the meat away from the fire.

The prior art exemplified by Rignell also provides means to direct grease away from the fire comprising a thin metal sheet with small holes to intercept and vaporize the grease as it falls from the meat above the fire and vaporizes it to pass upwardly in a gaseous state and permeate the meat.

SUMMARY OF THE INVENTION

According to the present invention a large quantity of meat, for example seventy-five hams or a like number of chickens are cooked at one time by supporting the meat in a rotatable support above a series of gas fired burners extending the length of the oven. A foraminated shelf preferably made from expanded metal is spaced above the burners and supports a quantity of wood chips, preferably hickory, arranged in closely spaced or touching relation to each other. A fire shield is horizontally disposed above the foraminated member, the fire shield being made of relatively thick metal on the order of 3.175 millimeters to 6.350 millimeters thick and preferably comprising a plurality of water compartments, although one water compartment extending across the cross-sectional dimensions of the oven will suffice for purposes of the invention. Means are provided for maintaining a depth of water in each compartment of between about 3.75 to 8.75 centimeters. Instead of or in addition to water, the compartments may contain any desired flavoring liquid, and the contents of the compartments will hereinafter be generically designated as fluid.

The fire shield has openings therethrough capped with elbow shaped fittings extending upwardly through the fire shield and above the fluid and through which smoke and heat from the fire pass to flues spaced around the top of the oven above the rotatable meat support. The foraminated wood tray spaced closely above the gas burners results in the wood chips being charred and emitting a heavy smoke accompanied by a suitable cooking temperature from the gas burners which combine to provide the optimum heat and flavor for the meat.

Grease from the meat falls into the fluid on the fire shield and vaporizes with the fluid instead of falling into the fire which would result in blaze-ups and consequent burning of the meat. The vaporized grease with the fluid from the fire shield and the mositure permeates the meat, increasing the cooking of the meat and its flavor. The fluid in the compartments on the fire shield enable the fire shield to function as an effective grease interceptor. The fire shield is, of course, heated by the gas burners in the combustion chamber, and the thick metal compartments transfer the heat to the fluid, causing it to vaporize and carry with it into the oven the grease that drops in the fluid from the meat thereby returning flavor to the meat as moisture which saturates the meat. The holes spaced about the periphery of the fire shield are effective to convey a sufficient draft of air from the combustion chamber into the cooking oven to cook the meat at a constant uniform temperature without hot spots and with a maximum flavor.

DETAILED DESCRIPTION OF THE INVENTION

Figure 1:
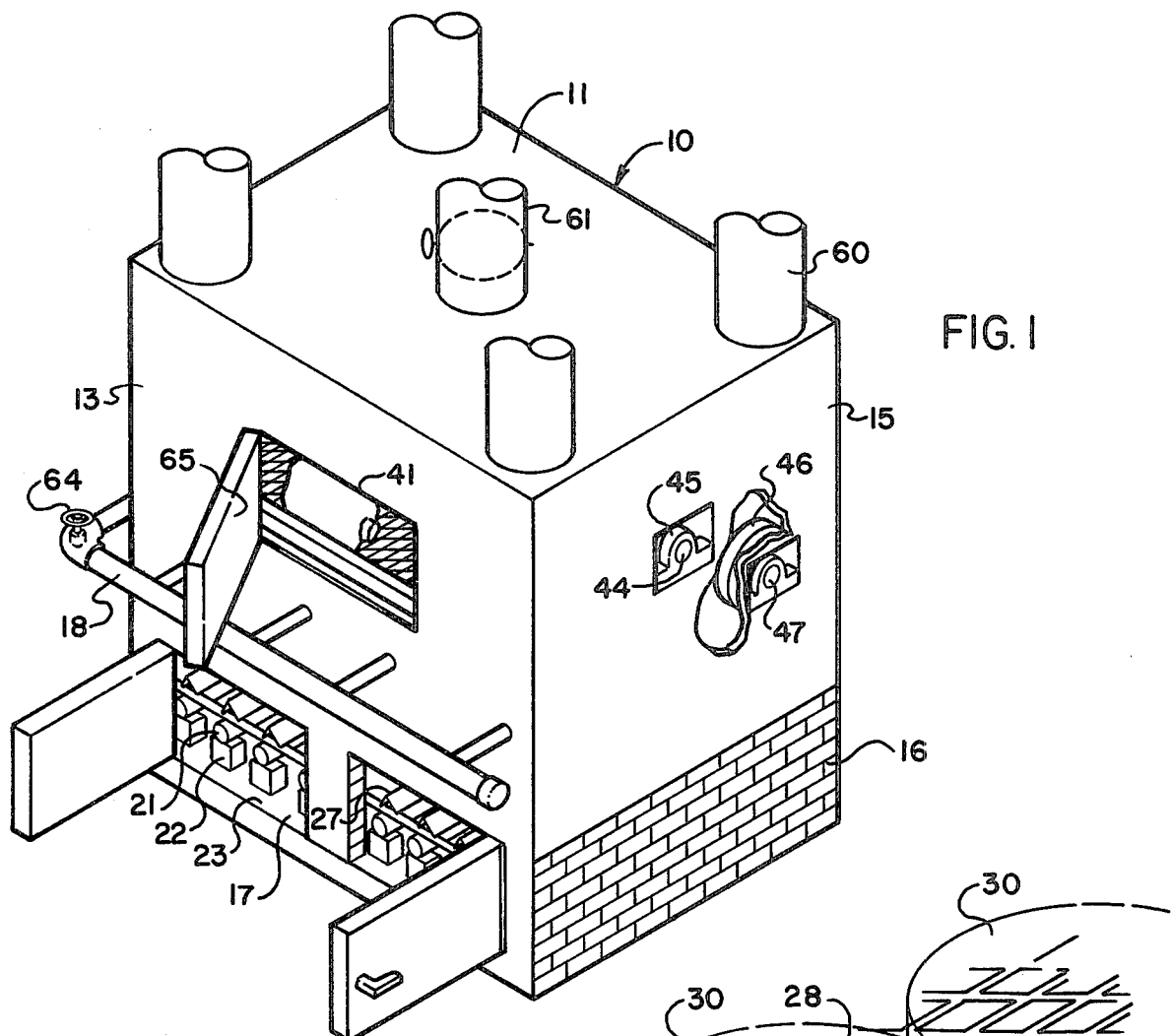
FIG. 1 is a perspective view showing the top, rear and one side of the barbecue oven.
Figure 5:
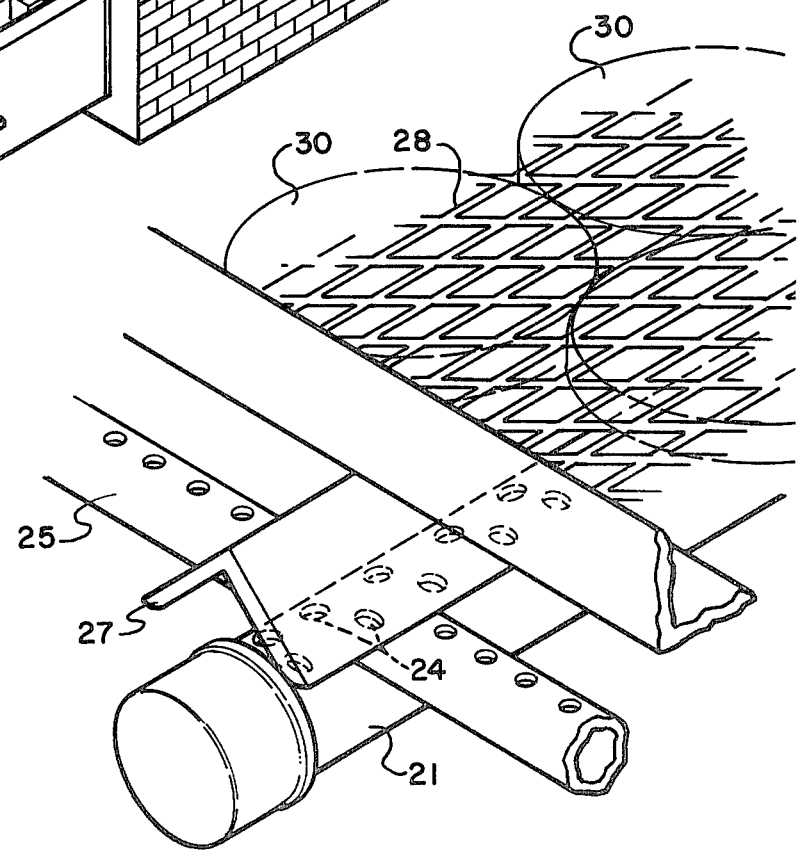
FIG. 5 is an enlarged fragmentary view with parts broken away illustrating the relationship of the gas burners, the deflectors, and the wood tray.

Referring more specifically to the drawings, the barbecue oven includes a housing 10 having a top wall 11, a front wall 12, a rear wall 13, and side walls 14 and 15. A base 16 extends circumferentially beneath front and rear walls 12, 13 and side walls 14, 15 to define a combustion chamber 17. The walls of the combustion chamber 16 are preferably made of brick while the walls of the housing 10 are preferably made of metal. The metal walls 11, 12, 13, 14, 15 of housing 10 define a cooking oven 20 immediately above the combustion chamber 17.

For purposes of illustration only and not by way of limitation, the cross-sectional dimensions of the cooking oven may be 2.59 meters (8-½ feet) by 1.98 meters (6-½ feet) with a vertical dimension of 2.28 meters (7-½ feet). The combustion chamber has a vertical height of 0.76 meters (2-½ feet) and cross-sectional dimensions corresponding to the cross-sectional dimensions of the cooking oven.

Disposed within the combustion chamber 17 and extending between the front wall 12 and rear wall 13 are a plurality of (preferably eight) gas burners 21 mounted on saddles 22 supported on a concrete footing 23. The gas burners 21 each have a double row of apertures 24 extending longitudinally of the pipes and through which gas passes from control valve 26. Control valve 26 is also connected to a pilot line 25 which extends from a source of gas, not shown. The pilot line 25 extends longitudinally from the front of the oven toward the rear ends of the gas burners 21 and then laterally closely adjacent the upper surfaces of the gas burners 21. When the control valve 26 is activated to admit gas to pilot line 25 and gas burners 21 within combustion chamber 17, the gas emitting from the pilot 25 may be ignited in the usual manner to ignite the gas admitted to gas burners 21 through control valve 26.

Immediately above the gas burners 21 and within the combustion chamber 17 diverters 27 formed of inverted angle irons extend in parallel relation to gas burners 21 and support a sheet of expanded metal 28 spaced about 15.25 centimeters (6 inches) above the gas burners 21. The expanded metal 28 allows heat to pass therethrough from the flames emitting from the gas burners 21 and to char a plurality of wood chips 30, preferably hickory, supported on the expanded metal 28. The hickory wood chips are preferably about 15.25 centimeters (6 inches) in diameter and about 2.54 centimeters (1 inch) thick and are arranged in a single layer and in touching relation to each other on the surface of the expanded metal 28. A layer of hickory sawdust (not shown) about 5 centimeters thick, or any desired depth may be laid on top of the woodchips to increase the flavor bearing smoke. The diverters 27 prevent the sawdust from clogging the holes in the burners and prevent the flames from directly contacting and igniting the wood chips 30. But the close proximity of the wood chips to the intense heat of the gas flames causes the chips 30 and sawdust to char and give off a large volume of smoke over a longer period of time than if the chips were ignited and burned.

At the top of the base 16 and spaced about 0.30 meters (one foot) above the wood tray 28 is a fire shield or vaporizer broadly indicated at 31 and illustrated as comprising a plurality of compartments 32 collectively having cross-sectional dimensions corresponding to those of the tray 28 and the combustion chamber 17. Each water compartment 32 has a bottom and side walls 29 made from a relatively thick sheet of metal between 6.35 millimeters (one-fourth inch) and 12.7 millimeters (one-half inch), a thickness of 7.9375 millimeters (five-sixteenths inch) having been found satisfactory. The fire shield 31 is between the combustion chamber 17 and cooking oven 20 and its compartments 32 are each adapted to contain a quantity of fluid F supplied through supply pipe 18 extending from a source of fluid, not shown. A float control valve 19 regulates the amount of fluid in each compartment, maintaining a fluid depth between 3.75 and 8.75 centimeters.

An overflow pipe 35 is provided in each compartment to carry off any excess of water that might develop through malfunction of float control valve 19 or otherwise. The overflow pipes 35 extend through the bottom wall of each compartment and communicate at their lower ends with waste water pipe 36 which carries waste water away from the oven to a point not shown. The upper ends of overflow pipes 35 are open and terminate above the normal level of fluid within the compartments and below the upper edge of said walls 29. Each compartment 32 also contains a drain opening 37 communicating with the upper surface of the bottom wall of the compartment 32 and communicating with the waste water pipe 36. The drain pipes 37 are normally closed by a stopper or plug 38 which is manually removable when desired to drain the compartments for maintenance or otherwise.

Figure 4:
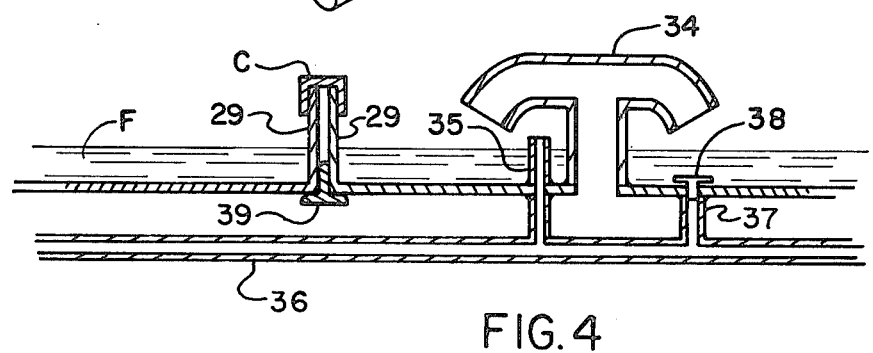
FIG. 4 is a vertical sectional view taken substantially along the line 4—4 in FIG. 3.
Figure 7:
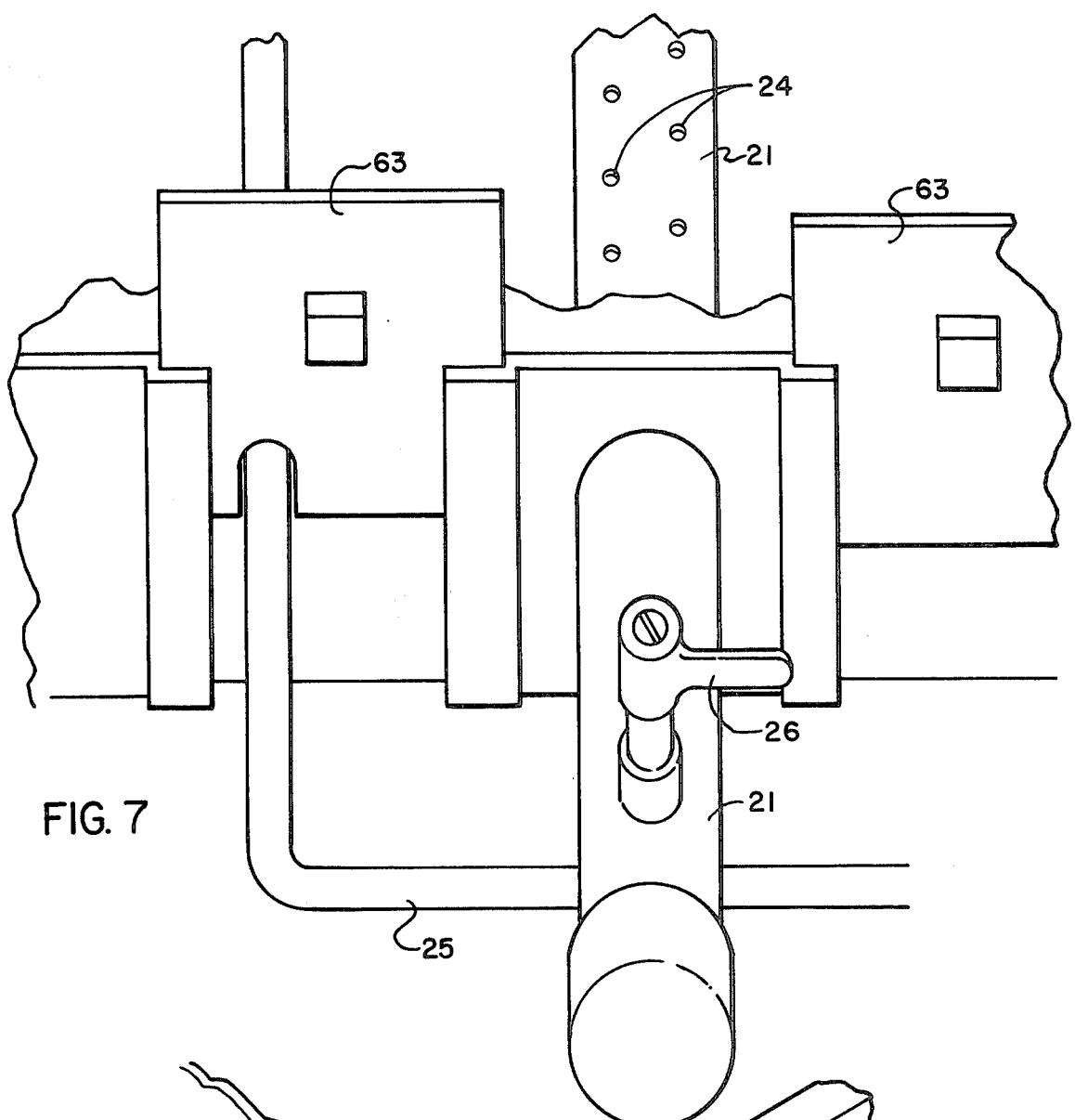
FIG. 7 is an enlarged fragmentary view, with parts broken away, of the control mechanism for the gas burners.
Figure 6:
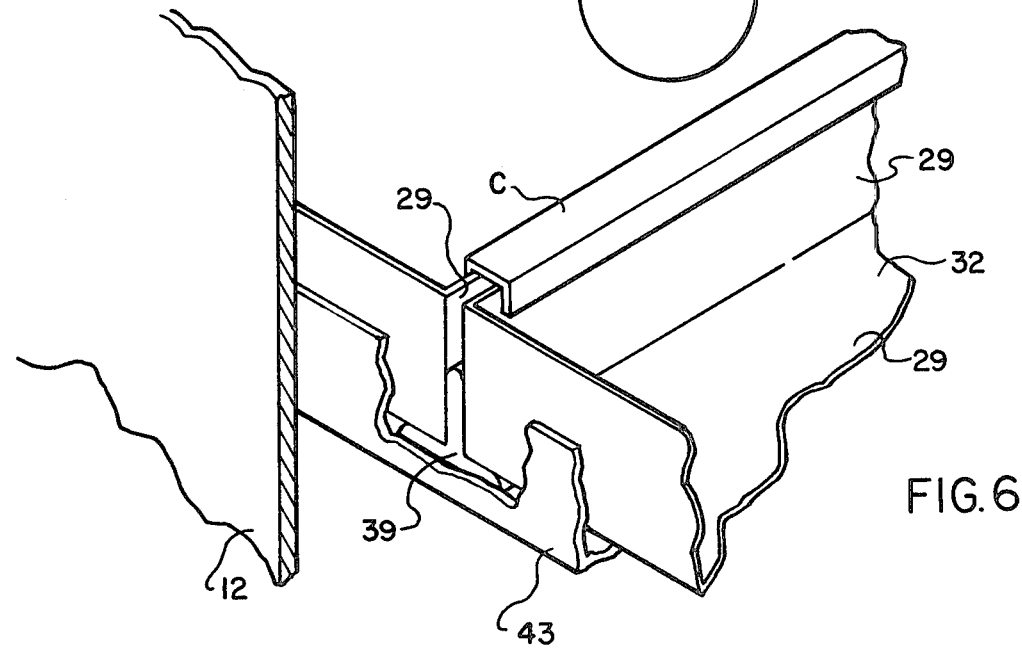
FIG. 6 is an enlarged fragmentary vertical sectional view partially in elevation and with parts broken away looking in the direction of the arrow A in FIG. 2.

The compartments 32 are supported on angle irons 39 which extend the length of the oven between front wall 12 and rear wall 13 and are supported on frame members 43. One function of the fire shield 31 is to prevent flames from reaching the meat being cooked and the water compartments 32 are arranged in closely spaced relation on their respective angle iron supports 39. U-shaped caps C cover the space between adjoining walls 29 to prevent the flames from rising between compartments 32 (FIGS. 4 and 6).

A plurality of vent openings, about 5 centimeters (2 inches) in diameter, extend in spaced relation to each other about the perimeter of the fire shield 31, and each of the vents is capped with an elbow-shaped vent outlet 33 extending upwardly, outwardly and downwardly from respective holes. Vent openings of corresponding size are centrally located in fire shield 31 and T-shaped vent outlets 34 extend upwardly, outwardly and downwardly therefrom. The outlets 33 and 34 provide communication between the combustion chamber 17 beneath the fire shield 31 and the cooking oven 20 above the fire shield 31 and the heated air for the cooking temperature and the smoke for the flavoring pass through these outlets and result in a uniform cooking temperature throughout the oven without hot spots that occur in the prior art.

Figure 2:
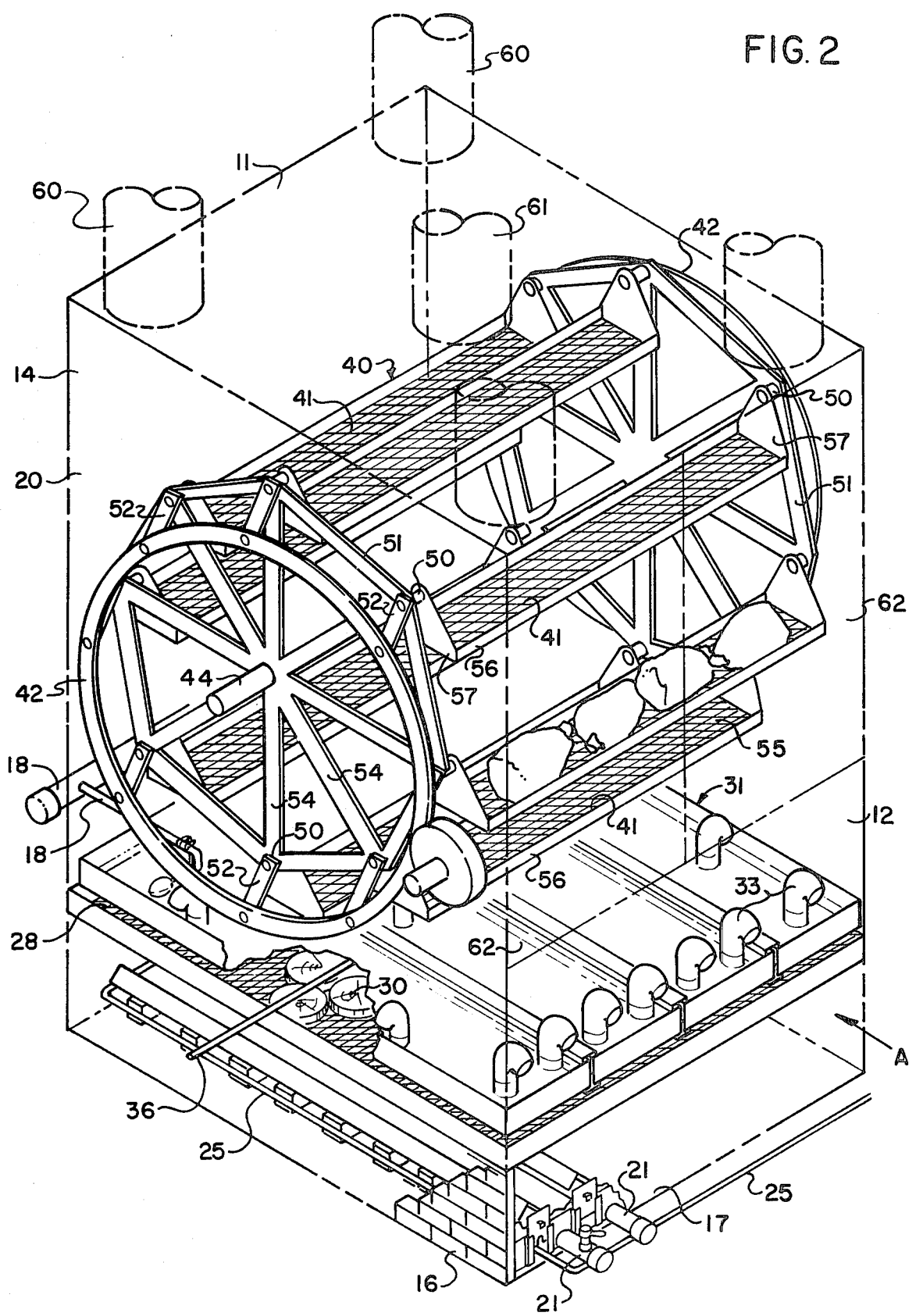
FIG. 2 is a perspective view looking at the top, front and one side of the barbecue oven, the housing of the oven being shown in phantom lines to more clearly illustrate the relative arrangement of the rotatable rack, fire shield, wood tray, deflectors, and gas burners within the oven.
Figure 3:
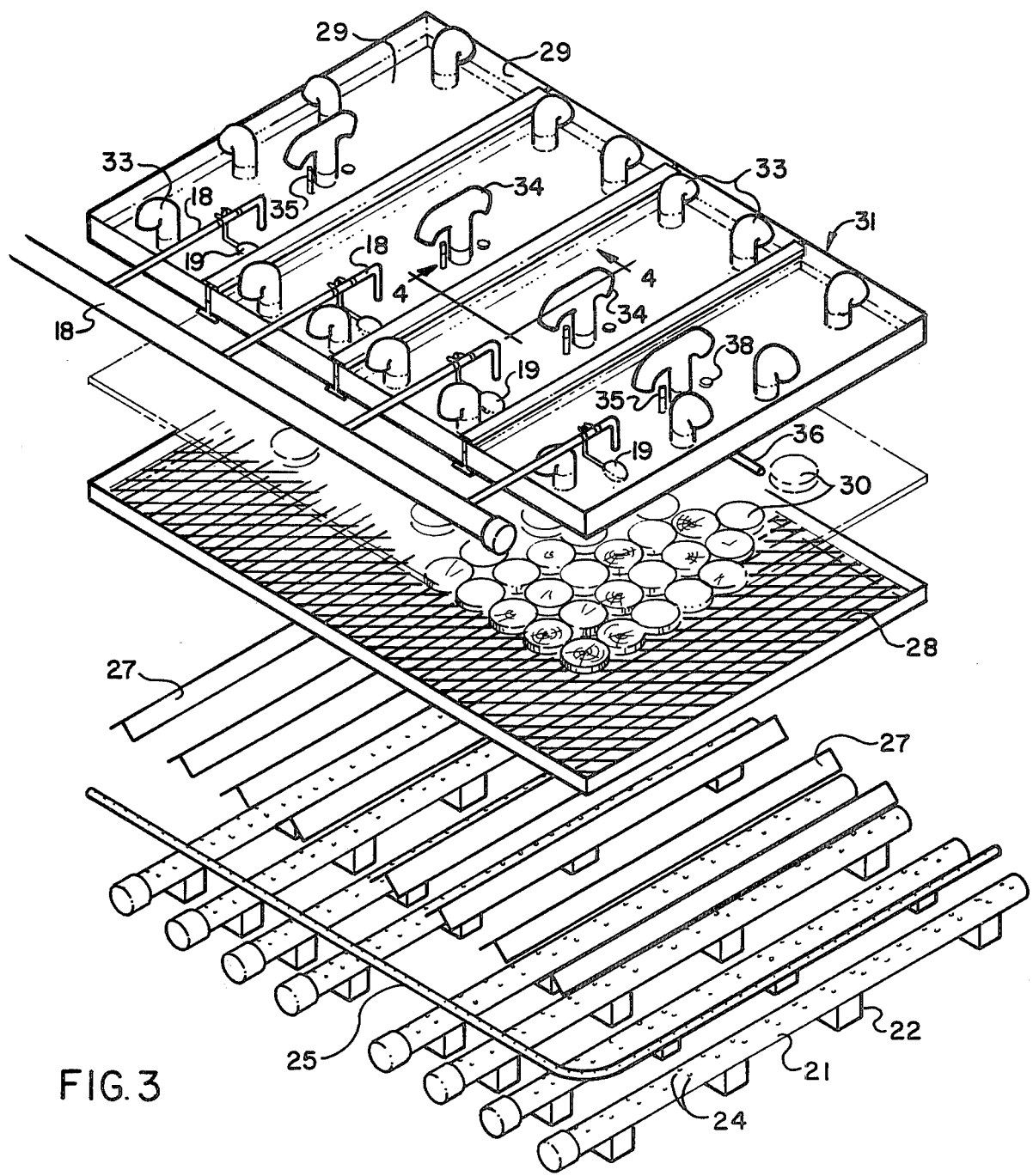
FIG. 3 is an expanded view of the footing, gas burners, deflectors, wood tray and fire shield removed from the oven for purposes of illustration.

A rotatable meat holder generally indicated at 40 (FIG. 2) is journaled in side walls 14 and 15 of housing 10. The meat holder 40 resembles a ferris wheel in that a plurality of racks 41, there being eight racks 41 illustrated in FIG. 2, are pivotally supported between rings 42 adjacent side walls 14, 15 respectively. The rings 42 are fixed to a horizontally extending shaft 44 journaled in bearings 45 in side walls 14 and 15, only one of which is shown in FIG. 1.

Shaft 44 and racks 41 of meat holder 40 are rotated by any suitable means such as an electric motor 46 having an output shaft 47 journaled at one end in side wall 15. Chain driven sprockets, not shown, may be arranged conventionally to impart rotation to shaft 44 to the racks 41 of meat holder 40.

The pivotal connections between racks 41 and opposed rings 42 comprise pivot pins 50 and supporting frame members 51 extending between adjacent racks 41. Connecting links 52 receive pivot pins 50 and are connected at their other ends to respective rings 42. Spokes 54 extend between shaft 44 and the supporting frame members 51 at their junctures with connecting links 52.

Each of the racks 41 in meat holder 50 is formed from expanded metal supported by a peripheral frame 56 having an upstanding connector lug 57 at each end for connection to the pivot pins 50.

The racks 41 each support a plurality of pieces of meat such as hams or chickens laid on the foraminated shelf 55. About ten hams can be supported on each rack and with six racks in the meat holder it has a capacity of about sixty hams.

A flue 60, each about 35.56 centimeters (14 inches) in diameter extends from each corner of top wall 11 and another flue 61 is centrally located in top wall 11 to provide a controllable and uniform draft through the cooking oven 20 from the combustion chamber 17.

Doors 62 in front wall 12 provide access to the interior of the oven 20 for loading and unloading the meat and for maintenance and cleaning. Vents 63 in the base 16 may be adjusted as desired to provide the requisite draft to circulate from the combustion chamber 17 through the vent outlets 33 and 34 into the cooking oven 20, and through the flues in the top wall to cause the smoke and uniform heat to permeate the meat. An access door 65 is preferably provided in rear wall 13 to facilitate cleaning and maintenance of the oven.

A desired flavor can be imparted to about twelve hundred pounds of meat with about one wheelbarrow full of wood chips 30 positioned as described on the wood tray 28 covered by another wheelbarrow full of sawdust, not shown, on top of the wood chips. The novel and effective distribution of flavorful smoke and moisture into and through the cooking oven 20 insures that full flavoring advantage is obtained in all of the meat being cooked.

In operation the meat holder 40 is slowly rotated while the gas burners are regulated to maintain a desired uniform temperature throughout the oven while charring the wood chips 30 and the sawdust to flavor the meat. During the process of cooking oils and greases drop from the meat and through the expanded metal racks 41 into the fluid F in the compartments 32 of the fire shield 31. The fire shield acts as a conduit for the heat from the combustion chamber 17 to heat the fluid F, which vaporizes and rises into the cooking oven 20 where it mixes with the smoke and heated air being uniformly distributed throughout the oven through the deflective vent outlets 33, 34 and spaced flues 60. The rotating meat holder 40 carries the meat during cooking into all areas of the oven to further insure that all pieces of meat are constantly and consistently cooked at the same temperature and premeated with the same flavor and moisture. The supply of fluid F to the compartments 32 of the fire shield 31 can be adjusted as desired or cut off completely by a valve 64 in supply line 18. The control valves 19 limit the maximum amount of fluid in the compartments and the cut-off valve 64 may be used to limit the amount of fluid delivered to the compartments. It may be desirable, for example, to turn off the fluid completely while cooking, or to admit fluid to the compartments and turn it off intermittently during cooking. Any grease that falls from the meat while the compartments are dry vaporizes on contact with the intensely not fire shield 31.

The described arrangement of gas burners, wood tray, fire shield, controllable fluid and rotatable meat holder combine to produce cooked meat which is consistently flavored to its optimum potential and uniformly cooked with the optimum heat and moisture.

In the drawings and specification there has been set forth a preferred embodiment of the invention and although specific terms are employed they are used in a descriptive and generic sense only and not for purposes of limitation.

What is claimed is:
1. A barbecue oven comprising:
  (a) a combustion chamber;
  (b) means for supporting combustion within said combustion chamber;
  (c) a cooking oven above the combustion chamber;
  (d) a rotatable meat holder movable in a circular path within said cooking oven,
  (e) means for rotating the meat holder during cooking of the meat;
  (f) a fire shield between the combustion chamber and the cooking oven, said fire shield comprising at least one water compartment on its upper surface, means for selectively introducing fluid into each compartment,
  (g) means for selectively draining fluid from each compartment, and
  (h) duct means extending through the fire shield and providing communication between the combustion chamber and the cooking oven, whereby heat is transmitted directly from the combustion chamber to the cooking oven through the duct means while water may be boiled to impart moisture to the contents of the oven.

2. A barbecue oven according to claim 1 wherein said cooking oven is defined by a housing including a top wall, side walls and front and rear walls and wherein the circular path of the meat holder extends adjacent the inner surfaces of said walls.

3. A barbecue oven according to claim 2 wherein said rotatable meat holder comprises a horizontally disposed rotatable shaft, a plurality of horizontally disposed racks arranged radially about said shaft in fixed relation to each other and to said shaft, and means pivotally supporting said racks for rotation with said shaft.

4. A barbecue oven according to claim 1 wherein said duct means includes a deflective outlet extending into the cooking oven.

5. A barbecue oven according to claim 4 which includes a plurality of deflective outlets and wherein at least some of the deflective outlets have an elbow configuration extending upwardly and then outwardly and downwardly above the fire shield to direct smoke and hot air passing through said openings away from the center of the oven and toward its perimeter.

6. A barbecue oven according to claim 4 which includes a plurality of deflective outlets and wherein at least some of the deflective outlets have a T-shaped configuration to divert smoke and hot air away from the center of the oven.

7. A barbecue oven according to claim 1 wherein the fire shield comprises a plurality of individual compartments, and a supply line extending from a source of fluid to each compartment and means for regulating the flow of fluid 5 through the supply line.

8. A barbecue oven according to claim 7 wherein an overflow pipe is in each compartment.

9. A barbecue oven according to claim 7 wherein each compartment includes a drain opening normally closed by a removable plug.

10. A barbecue oven according to claim 7 wherein the juncture of adjoining compartments is covered by a cap.

11. A barbecue oven according to claim 7 wherein the means for regulating the flow of fluid through the supply line includes a float control valve for each compartment.

12. A barbecue oven according to claim 11 wherein said means for regulating the flow of fluid through the supply line includes a cut-off valve in the supply line.

13. A barbecue oven according to claim 7 wherein said means for regulating the flow of fluid through the supply line includes a cut-off valve in the supply line.

14. A barbecue oven according to claim 7 wherein the fluid is water.

15. A barbecue oven according to claim 7 wherein the fluid includes a flavoring substance.

16. A barbecue oven comprising
  (a) a combustion chamber,
  (b) means for supporting combustion within the combustion chamber,
  (c) a cooking oven above the combustion chamber,
  (d) means supporting meat within the cooking oven, (e) at least one compartment between the combustion chamber and the cooking oven, (f) means for selectively introducing fluid into each compartment during cooking of the meat, (g) means for selectively draining fluid from each compartment, and (h) duct means extending through the compartment and providing communication between the combustion chamber and the cooking oven, whereby heat is transmitted directly from the combustion chamber to the cooking oven through the duct means while water may be boiled in the compartment to impart moisture to the contents of the oven.

17. A barbecue oven according to claim 1 wherein the combustion chamber includes a top wall and a plurality of flues are located along the perimeter of the top wall.

18. A barbecue oven according to claim 1 wherein the combustion chamber includes a top wall and a flue is located in the central portion of the top wall.

19. A barbecue oven according to claim 16 wherein the means for supporting combustion comprises at least one gas burner in the combustion chamber and means for regulating the flow of gas to the gas burner to provide the desired heat.

20. A barbecue oven according to claim 19 wherein an imperforate diverter extends in closely spaced parallel relation above each gas burner.

21. A barbecue oven according to claim 20 wherein the diverter is of inverted V-shaped configuration.

22. A barbecue oven according to claim 19 wherein means are provided for supporting wood within the combustion chamber close enough to the combustion to char the wood but protected from the combustion to prevent ignition of the wood.

23. A barbecue oven according to claim 22 wherein the means for supporting wood comprises a foraminated metal tray extending in spaced parallel relation beneath the fire shield and supported above the gas burners.

24. A barbecue oven according to claim 16 including means for limiting the amount of fluid in the compartment.

* * * * *